(12) United States Patent
Mou et al.

(10) Patent No.: US 12,669,805 B2
(45) Date of Patent: Jun. 30, 2026

(54) NUMERICAL CONTROL PROCESS DESIGN AND OPTIMIZATION METHOD BASED ON MACHINING KNOWLEDGE

(71) Applicant: CHENGDU AIRCRAFT INDUSTRIAL (GROUP) CO., LTD., Chengdu (CN)

(72) Inventors: Wenping Mou, Chengdu (CN); Shaochun Sui, Chengdu (CN); Xin Gao, Chengdu (CN); Yu Peng, Chengdu (CN); Pengcheng Wang, Chengdu (CN); Renzheng Li, Chengdu (CN); Yaohui Luo, Chengdu (CN); Li Tang, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 374 days.

(21) Appl. No.: 18/573,318

(22) PCT Filed: Jul. 26, 2021

(86) PCT No.: PCT/CN2021/108407
§ 371 (c)(1),
(2) Date: Dec. 21, 2023

(87) PCT Pub. No.: WO2023/272836
PCT Pub. Date: Jan. 5, 2023

(65) Prior Publication Data
US 2024/0288851 A1 Aug. 29, 2024

(30) Foreign Application Priority Data
Jun. 28, 2021 (CN) .......................... 202110721924.0

(51) Int. Cl.
*G05B 19/4155* (2006.01)

(52) U.S. Cl.
CPC ................................ *G05B 19/4155* (2013.01)

(58) Field of Classification Search
None
See application file for complete search history.

(56) References Cited

U.S. PATENT DOCUMENTS

| | | | | |
|---|---|---|---|---|
| 10,466,681 B1* | 11/2019 | Jones | ............... | G05B 19/40937 |
| 2016/0019270 A1* | 1/2016 | Jones | ................ | G05B 19/4097 |
| | | | | 700/98 |
| 2019/0310608 A1* | 10/2019 | Amer | ................ | G05B 19/4097 |

* cited by examiner

*Primary Examiner* — Mohammad Ali
(74) *Attorney, Agent, or Firm* — Westbridge IP LLC

(57) ABSTRACT

A numerical control process design and optimization method based on machining knowledge includes: constructing a machining knowledge data model by taking a machining feature as a carrier, performing ordered integration on various stages of programming, post-processing, cutting simulation, machining process monitoring and inspection, and machining result measurement, determining various storage data types, and storing data in each stage. By means of the numerical control process design and optimization method, data stream during the whole flow of product machining are connected; effective accumulation of knowledge in a full cycle of product machining is realized; a numerical control process basic data model is constructed by means of establishing an association relationship between machining knowledge and a feature of a part.

13 Claims, 3 Drawing Sheets

NUMERICAL CONTROL PROCESS DESIGN AND OPTIMIZATION METHOD BASED ON MACHINING KNOWLEDGE

CROSS-REFERENCE TO RELATED APPLICATIONS

This application is the National Stage of International Application No. PCT/CN2021/108407, filed on Jul. 26, 2021, which claims priority to Chinese Patent Application No. 202110721924.0, filed on Jun. 28, 2021. All of the aforementioned applications are incorporated herein by reference in their entireties.

TECHNICAL FIELD

The present application relates to the technical field of numerical control process design, in particular to a numerical control process design and optimization method based on machining knowledge.

BACKGROUND

Numerical control machining process serves as a link between a part design model and a final product, which directly affects the final machining quality of the part. In the aviation, aerospace, marine and so on industries, as the performance of products such as aircraft, rockets, and ships improves, parts of above-mentioned product show a trend of complexity and high precision, machining difficulty increases significantly, which puts forward higher requirements for numerical control machining process. In the multi-variety and small-batch production mode in the above-mentioned fields, it is not feasible to obtain efficient and stable process solutions through continuous iterative optimization, and machining process is unpredictable, which puts forward higher requirements for numerical control process design level.

The existing process design method primarily adopts a "human-computer interaction, human-centric" computer-aided manufacturing mode, which relies heavily on manual experience, has low efficiency and poor-quality stability, which has seriously affected the development cycle of parts. For example, the process preparation cycle of a large frame part of an aircraft extends up to 45 days, human-computer interaction exceeds 200,000 times, and the ratio between process preparation time to numerical control machining time is as high as 10:1. Process knowledge cannot be accumulated and inherited under existing process preparation mode, which has severely restricted the improvement of numerical control process level. In order to improve the level of numerical control process technology, an integrated process solution is urgently needed to achieve the accumulation and reuse of process knowledge.

Existing disclosed numerical control process design methods mainly include directions such as cutting parameter optimization, machining trajectory optimization, knowledge-based process decision-making, which can improve the level of numerical control process design to a certain extent, but do not realize process closed-loop control in the numerical control process design stage and seamless data connectivity throughout the entire product machining cycle, which cannot effectively improve the level of numerical control process design.

SUMMARY

To address the deficiencies in existing technologies, the present application provides a numerical control process design and optimization method based on machining knowledge, aiming to achieve process closed-loop control during the numerical control process design stage and seamless data connectivity throughout the entire product machining cycle, which effectively enhances the level of numerical control process design.

To solve the aforementioned technical problems, the present application employs following technical solutions.

A numerical control process design and optimization method based on machining knowledge includes:

Step 1: constructing a machining knowledge data model by taking a machining feature as a carrier, taking machining data flow as a main line, systematically integrating programming, post-processing, cutting simulation, machining process monitoring and inspection, and machining result inspection to determine various storage data types, and storing data in each phase:

Step 2: obtaining a feature to be processed from a part, and obtaining a similar feature set with features the same as the feature to be processed from the constructed machining knowledge data model based on a feature similarity evaluation method:

Step 3: in regard to historical machining effect of the similar feature set, obtaining a comprehensive evaluation value of the historical machining effect of similar features based on a historical machining effect evaluation result and based on an entropy weight method:

Step 4: from the similar feature set, obtaining a feature with a best comprehensive evaluation of the historical machining effect and its corresponding process scheme, and taking the process scheme as a process scheme of the feature to be processed:

Step 5: during numerical control process design stage, based on software integration and machining data integration, a cutting simulation result being fed back to programming stage as a basis for process optimization to achieve closed-loop control during the process design stage:

Step 6: during numerical control machining stage of the part, obtaining monitoring and inspection data of machining process status in the machining process, and obtaining inspection data of machining result after machining; and Step 7: storing the monitoring and inspection data of machining process status, inspection data of machining result and data of each phase of process design into the machining knowledge data model as a basis for subsequent numerical control process optimization.

Preferably, in Step 1, the machining feature includes information on feature type, feature geometric structure, feature geometric dimension, feature machining accuracy, feature material property and positional relationship between features, the feature type includes grooves, ribs, holes and contours.

Preferably, in Step 1, in programming phase, the data types in the machining knowledge data model include blank dimension, clamping scheme, machining process, machining step, machine tool, cutting tool, machining feature, tool feeding strategy, tool approach and retraction method, cutting parameter:

in post-processing phase, the data types in the machining knowledge data model include machining process, machining step and NC program, the NC program includes NC code, feature number, machining operation number, and machining process monitoring and inspection instruction, the machining process monitoring and inspection instruction includes probe inspection trigger instruction, intermediate state monitoring trigger instruction;

in cutting simulation phase, the data types in the machining knowledge data model include cutting simulation file, NC program and simulation result, the simulation result includes anomaly information on undercutting, overcutting, and collision of part machining, machining simulation time information, and machining simulation cutting volume change information;

in machining process monitoring and inspection phase, the data types in the machining knowledge data model include NC program, machine tool power monitoring data, cutting vibration monitoring data, intermediate state probe inspection data and intermediate state ultrasonic thickness measurement data in the machining process;

in machining result inspection phase, the data types in the machining knowledge data model include machining feature, machining result inspection program, geometric tolerance inspection data, feature dimension inspection data and surface quality inspection data.

Preferably, in Step 2, the feature similarity evaluation method is: obtaining a similarity between different features based on an evaluation index, and then obtaining a feature set with features the same as the feature to be processed with a similarity higher than an expected value; the evaluation index includes feature type, material, dimension, structure, machining accuracy, machine tool and cutting tool which are used.

Preferably, in Step 3, the historical machining effect evaluation takes machining feature and its corresponding machining process as evaluation objects, including machining process status evaluation and machining result evaluation, the machining process corresponding to the machining feature includes machining resource information on feed strategy of feature machining, cutting parameters, machining sequence of feature, and machine tools and cutting tools.

Preferably, the machining process status evaluation refers to an evaluation of a status of the machining process being good or not when the machining feature is processed using a certain process, evaluation indicators include vibration of cutting tool during the machining process, machine tool power signal change, intermediate state dimensional change, deformation during the machining process of the part, cutting tool wear and an abnormal condition during the machining process.

Preferably, the machining result evaluation refers to an evaluation of a machining result being good or not after the machining feature is processed using a certain process, evaluation indicators include machining time, final machining dimensional accuracy of the feature, surface machining quality, feature deformation and machining cost.

Preferably, in Step 5, the software integration refers to using CAM software as a platform to achieve effective integration of programming, post-processing and cutting simulation during the numerical control process design stage.

Preferably, in Step 5, the machining data integration includes process data integration and machining process data integration: where process data integration refers to using an integrated software as a platform and using the machining knowledge data model as a carrier during the numerical control process design stage of the part, to realize transferring of machining requirements of the feature, process steps, machining program, simulation result data across each stage of process design of programming, post-processing, and cutting simulation: machining process data integration refers to using the machining feature as the carrier to realize transferring of machining program, machining process, each process information of machining step, monitoring and inspection data of machining process, and inspection data of machining result across each stage of an entire machining process, the monitoring and inspection data of machining process being fed back to the process design stage.

Preferably, the programming refers to realizing a new compilation and optimization of the machining program based on machining knowledge and machining process data, including process scheme formulation, machining sequence planning, cutting parameter optimization and tool feed strategy decision-making, and the programming implements a standardized programming model, including machining program naming, auxiliary geometry creation, part model, blank and fixture structure tree setting, the pre-program generated after programming including process information on machining features, operations.

Preferably, the post-processing refers to generating the NC program corresponding to the machining tool based on the pre-program, retaining the process information on machining features and operations in the NC program, and based on the machining requirements of the part, machining process monitoring and inspection triggering instruction is added to the NC program.

Preferably, the cutting simulation refers to simulation verification of a cutting path, further integrating machining experience and knowledge to check the rationality of the usage of cutting tools and sleeve, setting of cutting parameters, and setting of step sequence, and outputting cutting simulation result which is fed back to the programming phase.

Preferably, the machining process monitoring and inspection refers to during the machining process, when the NC program reaches the monitoring and inspection trigger instruction, the machining process monitoring program is activated, the monitoring data of machine tool power and cutting vibration of the machining process is obtained, and the probe program is triggered to realize in-process inspection and ultrasonic thickness measurement at a intermediate stage, and establish an association relationship between the machining process data and the NC program.

Preferably, the machining result inspection refers to measuring final machining dimension, geometric tolerance, and surface quality of the part based on a measurement program after completion of part machining, and establishing a association relationship between measurement data and machining feature of the part.

The advantageous effects of the present application are reflected as follows.

1. The present application systematically integrates programming, post-processing, cutting simulation, machining process monitoring and inspection, and machining result inspection, which achieves effective accumulation of knowledge throughout the entire product machining cycle, and based on historical machining effect evaluation result, it enables the reuse of machining knowledge, forming a process closed-loop control for the entire product machining cycle, completing numerical control process design and optimization, which effectively prevents the recurrence of historical machining quality issues, significantly enhances the level of numerical control process design, so as to provide an efficient and stable numerical control process scheme for intelligent machining.

2. During numerical control process design stage, based on software integration and machining data integration, the cutting simulation result is fed back to the programming stage as the basis for process optimization in the present application, by means of software integration, it can achieve the data transferring of feature machining requirements, process steps, machining programs, simulation results, and other data across various stages of process design such as programming, post-processing, and cutting simulation, which achieves the objective of closed-loop control in the numerical control process design stage: simultaneously, machining data integration is divided into process data integration and machining process data integration. Process data integration can realize transferring of machining requirements of the feature, process steps, machining program, simulation result data across each stage of process design of programming, post-processing, and cutting simulation, thereby achieving the objective of closed-loop control in the numerical control process design stage: machining process data integration can realize transferring of machining program, machining process, each process information of machining step, monitoring and inspection data of machining process, and inspection data of machining result across each stage of the entire machining process, the monitoring and inspection data of machining process being fed back to the process design stage, thereby providing data support for numerical control process design and optimization, by means of synergistic effect of software integration and machining data integration, providing robust support for achieving closed-loop control during the numerical control process design stage and numerical control process design and optimization.

BRIEF DESCRIPTION OF THE DRAWINGS

In order to illustrate the specific embodiments of the present application or the technical solutions in the prior art more clearly, the following briefly introduces the accompanying drawings that need to be used in the description of the specific embodiments or the prior art. Throughout the drawings, similar elements or portions are generally identified by similar reference numerals. In the drawings, elements or portions are not necessarily drawn to actual scale.

DETAILED DESCRIPTION OF THE EMBODIMENTS

Figure 1:
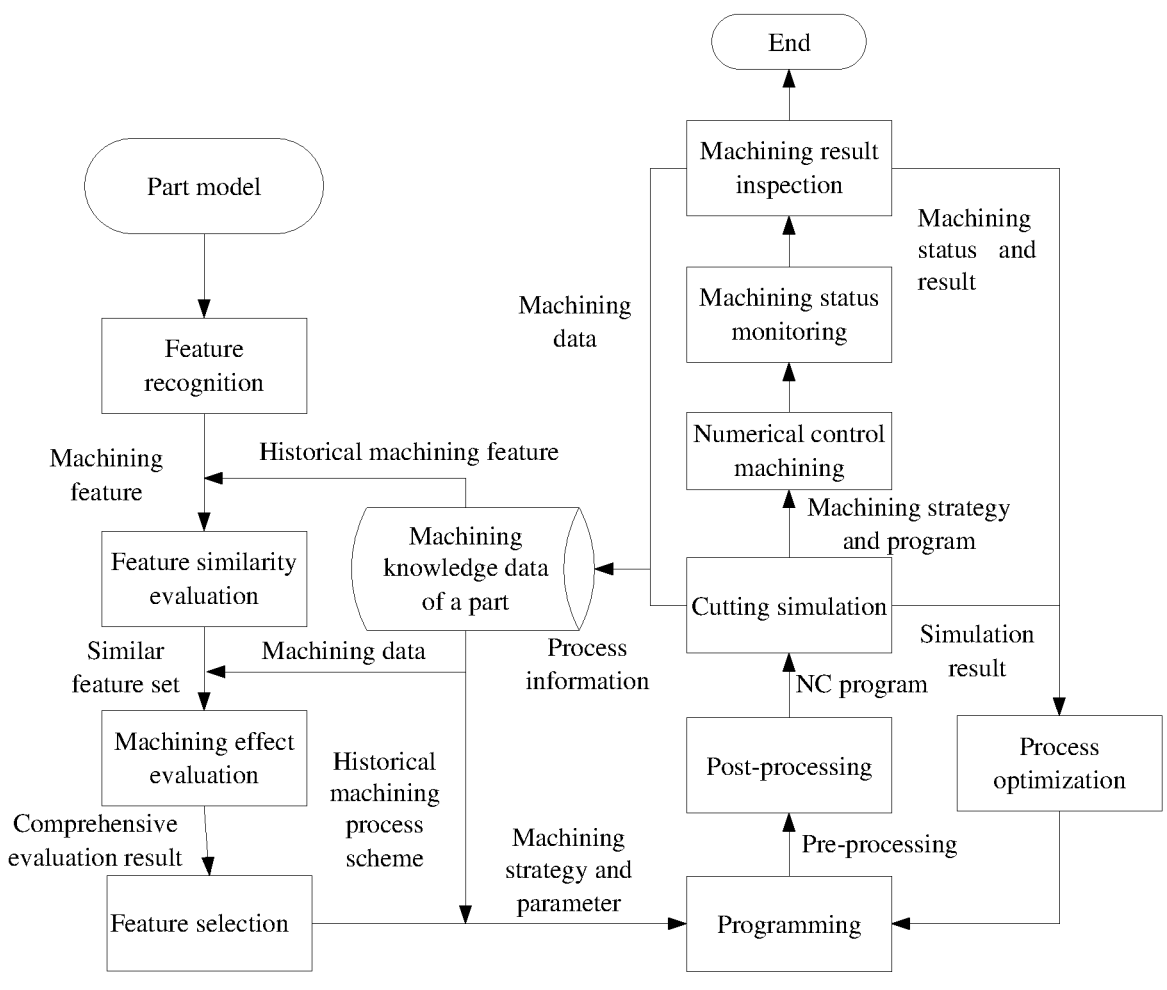
FIG. 1 is a schematic flow chart of a numerical control process design and optimization method based on machining knowledge according to the present application.

In order to make the purpose, technical solutions and advantages of the embodiments of the present application clearer, the technical solutions in the embodiments of the present application will be clearly and completely described below with reference to the accompanying drawings of the present application. Obviously, the described embodiments are only a part of the embodiments of the present application, but not all of the embodiments. Generally, the components of the embodiments of the present application described and illustrated in the accompanying drawings herein may be arranged and designed in a variety of different configurations.

Therefore, the following detailed description of the embodiments of the present application provided in the accompanying drawings is not intended to limit the scope of the claims protecting the present application, but rather to represent selected embodiments of the present application. Based on the embodiments of the present application, all other embodiments obtained by those of ordinary skill in the art without making creative efforts fall within the scope of protection of the present application.

It should be noted: similar reference numerals and letters represent similar items in the following accompanying drawings, therefore, once an item is defined in one drawing, it does not need further definition and explanation in subsequent drawings.

EMBODIMENTS

Figure 2:
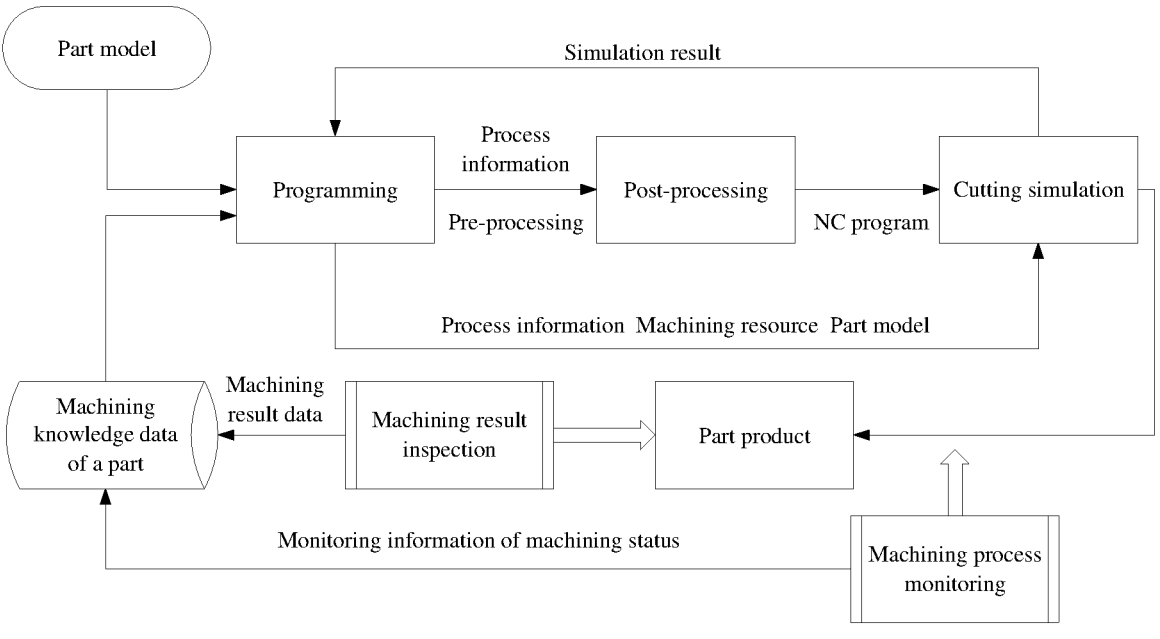
FIG. 2 is a schematic flow chart of a process closed-loop control for the entire product machining cycle according to the present application.
Figure 3:
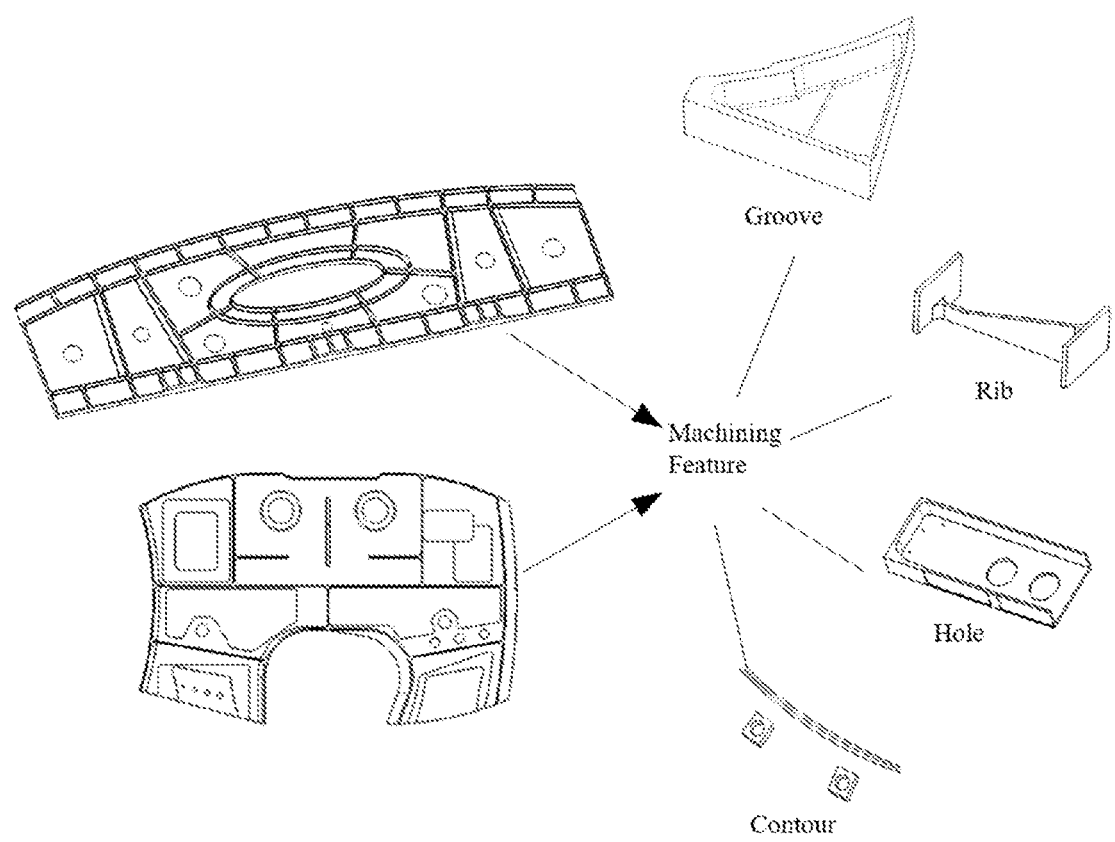
FIG. 3 is a schematic diagram of typical machining features of parts.

As shown in FIGS. 1-3, a numerical control process design and optimization method based on machining knowledge is provided in this embodiment, including the following steps.

Step 1: constructing a machining knowledge data model by taking a machining feature as a carrier, taking machining data flow as a main line, systematically integrating programming, post-processing, cutting simulation, machining process monitoring and inspection, and machining result inspection to determine various storage data types, and storing data in each phase:

Step 2: obtaining a feature to be processed from a part, and obtaining a similar feature set with features the same as the feature to be processed from the constructed machining knowledge data model based on a feature similarity evaluation method:

Step 3: in regard to historical machining effect of the similar feature set, obtaining a comprehensive evaluation value of the historical machining effect of similar features based on a historical machining effect evaluation result and based on an entropy weight method:

Step 4: from the similar feature set, obtaining a feature with a best comprehensive evaluation of the historical machining effect and its corresponding process scheme, and taking the process scheme as a process scheme of the feature to be processed:

Step 5: during numerical control process design stage, based on software integration and machining data integration, a cutting simulation result being fed back to programming stage as a basis for process optimization to achieve closed-loop control during the process design stage:

Step 6: during numerical control machining stage of the part, obtaining monitoring and inspection data of machining process status in the machining process, and obtaining inspection data of machining result after machining; and Step 7: storing the monitoring and inspection data of machining process status, inspection data of machining result and data of each phase of process design into the machining knowledge data model as a basis for subsequent numerical control process optimization.

In this embodiment, the machining knowledge data model realizes the storage of machining knowledge via taking the machining feature as the carrier. By means of systematically integration of programming, post-processing, cutting simulation, machining process monitoring and inspection, machining result inspection and other phases, the effective accumulation of the knowledge in the entire product machining cycle can be realized, and based on the historical machining effect evaluation result, reuse of machining knowledge (i.e. Step 2 to Step 4) can be realized, forming a process closed-loop control for the entire product machining process, completing the numerical control process design and optimization, thereby effectively avoiding recurrence of historical machining quality problems, which can significantly improve the level of numerical control process design and provide efficient and stable numerical control process solutions for intelligent machining.

Specifically, in Step 1, the machining feature includes information on feature type, feature geometric structure, feature geometric dimension, feature machining accuracy, feature material property and positional relationship between features, the feature type includes groove, rib, hole and contour.

Specifically, in order to better store data information at different stages of the entire product machining cycle, the data types stored in the machining knowledge data model are different in regard to different phases. Therefore, in Step 1:

in the programming phase, the data types in the machining knowledge data model include process information and information on machining feature, such as blank dimensions, clamping scheme, machining process, machining steps, machine tools, cutting tools, machining features, tool feeding strategy, tool approach and retraction method, cutting parameters;

in the post-processing phase, the data types in the machining knowledge data model include machining process, machining step and NC program. In order to achieve an association relationship and correspondence of data information in different phases, the NC program not only includes NC code, but also includes feature number, machining operation number, and machining process monitoring and inspection instruction: the feature number format is "feature type+feature serial number", for example, No. 1 pocket feature is "Pocket+0001", No. 1 rib feature is "Rib+0001", and No. 1 hole feature is "Hole+0001": the machining operation number format is "machining process+machining step+operation type+operation serial number", for example, the third milling operation in Step 03 of Process 15 is "Process15+Step03+FaceMilling+0003"; the machining process monitoring and inspection instruction includes probe inspection trigger instruction, intermediate state monitoring trigger instruction, etc.;

in the cutting simulation phase, the data types in the machining knowledge data model include cutting simulation file, NC program and simulation result. The simulation result includes anomaly information on undercutting, overcutting, and collision of part machining, machining simulation time information, and machining simulation cutting volume change information, and the above information is associated with the machining code in the NC program;

in the machining process monitoring and inspection phase, the data types of the machining knowledge data model include NC program, machine tool power monitoring data, cutting vibration monitoring data, intermediate state probe inspection data and intermediate state ultrasonic thickness measurement data in the machining process: the above data is associated with the machining code in the NC program, so as to match the machining process monitoring data with the process information to facilitate subsequent process optimization and analysis;

in the machining result inspection phase, the data types in the machining knowledge data model include machining feature, machining result inspection program, feature shape and position tolerance inspection data, feature size inspection data and surface quality inspection data, as well as the relationship between the above data and the machining feature.

Specifically, in Step 2, the feature similarity evaluation method is: obtaining a similarity between different features based on an evaluation index, and then obtaining a feature set with features the same as the feature to be processed with a similarity higher than an expected value: the evaluation index includes feature type, material, dimension, structure, machining accuracy, machine tool and cutting tool which are used.

Specifically, in Step 3 the historical machining effect evaluation takes machining feature and its corresponding machining process as the evaluation objects, including machining process status evaluation and machining result evaluation. The machining process corresponding to the machining feature includes machining resource information on feed strategy of feature machining, cutting parameters, machining sequence of feature, and machine tools and cutting tools: where, the machining process status evaluation refers to the evaluation of the status of the machining process being good or not when the machining feature is processed using a certain process. The evaluation indicators include vibration of cutting tool during the machining process, machine tool power signal change, intermediate state dimensional change, deformation during the machining process of the part, cutting tool wear and an abnormal condition during the machining process: the evaluation factors of different evaluation indicators are determined based on the impact of the evaluation indicators on the final machining quality, cost, and efficiency of the features, and the evaluation value of the machining process status can be obtained through the weighting method;

machining result evaluation refers to the evaluation of the machining result after the machining feature is processed using a certain process. The evaluation indicators include machining time, final machining dimensional accuracy of the feature, surface machining quality, feature deformation and machining cost: the corresponding evaluation factor is determined based on the impact of the evaluation indicators, and evaluation value of the machining result can be obtained through the weighting method.

It should be noted that the comprehensive evaluation value of the machining process and machining result is obtained by comprehensively calculating, based on the evaluation of the machining process status and machining result, and based on the entropy weight method to determine the influencing factor of the machining process status and machining result.

Specifically, in Step 5, software integration refers to using CAM software as a platform to achieve effective integration of programming, post-processing and cutting simulation during the numerical control process design stage.

The specific meaning of the integration of each software in the process design stage is that after the programming is completed, the post-processing system is automatically called in the CAM environment to generate an NC program that matches the machine tool, and based on machining process and step setting information on the part, a cutting simulation environment including the part, blank, fixture, machine tool, and cutting tool is automatically generated. At the same time, the cutting simulation result will be fed back to the programming stage as a basis for process optimization to realize the transferring of data such as machining requirements of the feature, process steps, machining program, simulation result across each stage of process design such as programming, post-processing, and cutting simulation, so as to achieve the purpose of closed-loop control in the numerical control process design stage.

Specifically, in Step 5, machining data integration includes process data integration and machining process data integration: where, process data integration refers to using an integrated software as a platform and using the machining knowledge data model as a carrier during the numerical control process design stage of the part, to realize transferring of data such as machining requirements of the feature, process steps, machining program, simulation result in each stage of process design of programming, post-processing, and cutting simulation, so as to achieve the purpose of closed-loop control in the numerical control process design stage;

machining process data integration refers to using machining features as a carrier to realize the transferring of machining program, machining process, each process information of machining step, monitoring and inspection data of machining process, and inspection data of machining result across each stage of the entire machining process, the monitoring and inspection data of machining process being fed back to the process design stage to provide data support for numerical control process design and optimization.

Specifically, programming refers to realizing a new compilation and optimization of machining programs based on machining knowledge and machining process data, including process scheme formulation, machining sequence planning, cutting parameter optimization and tool feed strategy decision-making: in order to realize software integration of the process design stage, to establish a seamless flow of process data, programming implements a standardized programming model, including machining program naming, auxiliary geometry creation, part model, blank and fixture structure tree settings, the pre-program generated after programming includes process information such as machining features, operations.

Specifically, post-processing refers to generating the NC program corresponding to the machining tool based on the pre-program, retaining the process information such as machining features and operations in the NC program, thereby realizing the association of subsequent machining process data with the machining features and operations, and facilitating the traceability of machining abnormalities, to enable rapid positioning of the machining program of abnormal parts; and based on machining requirements of the part, the machining process monitoring and inspection triggering instruction is added to the NC program to monitor the intermediate status of a key part.

Specifically, cutting simulation refers to the simulation verification of a cutting path. It further integrates machining experience and knowledge to check the rationality of the usage of cutting tools and sleeves, setting of cutting parameters, and setting of step sequence, and outputs cutting simulation result which is fed back to programming phase.

Specifically, the machining process monitoring and inspection refers to that during the machining process, when the NC program reaches the monitoring and inspection trigger instruction, the machining process monitoring program is activated, the monitoring data of machine tool power and cutting vibration during the machining process is obtained, and the probe program is triggered to realize in-process inspection and ultrasonic thickness measurement at a intermediate stage, and establish an association relationship between the machining process data and the NC program, so as to realize in-process inspection and ultrasonic thickness measurement at a intermediate stage. Based on the association relationship between the machining process data and the NC program, the monitoring and inspection data is stored into the machining knowledge data model to provide data support for numerical control process design and optimization.

Specifically, the machining result inspection refers to measuring a final machining dimension, geometric tolerance, and surface quality of the part based on a measurement program after the completion of part machining, and establishing an association relationship between measurement data and the machining features of the part. Based on the association relationship between the above measurement data and the machining features of the part, the data of machining result inspection is stored in the machining knowledge data model to provide data support for numerical control process design and optimization.

The final point to note is: the above embodiments are only used to illustrate the technical solutions of the present application, but not to limit it. Despite the detailed description provided in reference to these embodiments, those of ordinary skill in the art should understand that: the technical solutions described in the foregoing embodiments can still be modified, or some or all of the technical features can be equivalently replaced; and these modifications or substitutions do not deviate from the essence of the corresponding technical solution within the scope of the various embodiments of the present application, and they should all fall within the scope of the claims and specifications of the present application.

What is claimed is:

1. A numerical control process design and optimization method based on machining knowledge, comprising:

constructing a machining knowledge data model by taking a machining feature as a carrier, taking machining data flow as a main line, systematically integrating programming, post-processing, cutting simulation, machining process monitoring and inspection, and machining result inspection to determine various storage data types, and storing data in each phase;

obtaining a feature to be processed from a part, and obtaining a similar feature set with features the same as the feature to be processed from the constructed machining knowledge data model based on a feature similarity evaluation method;

in regard to historical machining effect of the similar feature set, obtaining a comprehensive evaluation value of the historical machining effect of similar features based on a historical machining effect evaluation result and based on an entropy weight method;

from the similar feature set, obtaining a feature with a best comprehensive evaluation of the historical machining effect and its corresponding process scheme, and taking the process scheme as a process scheme of the feature to be processed;

during numerical control process design stage, based on software integration and machining data integration, a cutting simulation result being fed back to programming stage as a basis for process optimization to achieve closed-loop control during the process design stage;

during numerical control machining stage of the part, obtaining monitoring and inspection data of machining process status in the machining process, and obtaining inspection data of machining result after machining; and storing the monitoring and inspection data of machining process status, inspection data of machining result, and data of each phase of process design into the machining knowledge data model as a basis for subsequent numerical control process optimization;

wherein in the step of constructing a machining knowledge data model by taking a machining feature as a carrier, taking machining data flow as a main line, systematically integrating programming, post-processing, cutting simulation, machining process monitoring and inspection, and machining result inspection to determine various storage data types, and storing data in each phase:

in the programming phase, the data types in the machining knowledge data model comprise blank dimensions, clamping scheme, machining process, machining steps, machine tools, cutting tools, machining features, tool feeding strategy, tool approach and retraction method, cutting parameters;

in the post-processing phase, the data types in the machining knowledge data model comprise machining process, machining step and NC program, the NC program comprises NC code, feature number, machining operation number, and machining process monitoring and inspection instruction, the machining process monitoring and inspection instruction comprises probe inspection trigger instruction, intermediate state monitoring trigger instruction;

in the cutting simulation phase, the data types in the machining knowledge data model comprise cutting simulation file, NC program and simulation result, the simulation result comprises anomaly information on undercutting, overcutting, and collision of part machining, machining simulation time information, and machining simulation cutting volume change information;

in the machining process monitoring and inspection phase, the data types in the machining knowledge data model comprise NC program, machine tool power monitoring data, cutting vibration monitoring data, intermediate state probe inspection data and intermediate state ultrasonic thickness measurement data in the machining process; and in the machining result inspection phase, the data types in the machining knowledge data model comprise machining feature, machining result inspection program, geometric tolerance inspection data, feature dimension inspection data and surface quality inspection data.

2. The numerical control process design and optimization method based on machining knowledge according to claim 1, wherein the machining feature comprises information on feature types, feature geometric structures, feature geometric dimensions, feature machining accuracy, feature material property and positional relationship between features, wherein the feature type comprises grooves, ribs, holes and contours.

3. The numerical control process design and optimization method based on machining knowledge according to claim 1, wherein in the step of obtaining a feature to be processed from a part, and obtaining a similar feature set with features the same as the feature to be processed from the constructed machining knowledge data model based on a feature similarity evaluation method, the feature similarity evaluation method is:

obtaining a similarity between different features based on an evaluation index, and then obtaining a feature set with features the same as the feature to be processed with a similarity higher than an expected value; and the evaluation index comprises feature type, material, dimension, structure, machining accuracy, machine tool and cutting tool which are used.

4. The numerical control process design and optimization method based on machining knowledge according to claim 1, wherein in the step of in regard to historical machining effect of the similar feature set, obtaining a comprehensive evaluation value of the historical machining effect of similar features based on a historical machining effect evaluation result and based on an entropy weight method, the historical machining effect evaluation takes machining feature and its corresponding machining process as evaluation objects, comprising machining process status evaluation and machining result evaluation, the machining process corresponding to the machining feature comprises machining resource information on feed strategy of feature machining, cutting parameters, machining sequence of feature, and machine tools and cutting tools.

5. The numerical control process design and optimization method based on machining knowledge according to claim 4, wherein the machining process status evaluation refers to an evaluation of a status of the machining process being good or not when the machining feature is processed using a certain process, evaluation indicators comprise vibration of cutting tool during the machining process, machine tool power signal change, intermediate state dimensional change, deformation during the machining process of the part, cutting tool wear and an abnormal condition during the machining process.

6. The numerical control process design and optimization method based on machining knowledge according to claim 5, wherein the machining result evaluation refers to an evaluation of a machining result being good or not after the machining feature is processed using a certain process, evaluation indicators comprise machining time, final machining dimensional accuracy of the feature, surface machining quality, feature deformation and machining cost.

7. The numerical control process design and optimization method based on machining knowledge according to claim 1, wherein in the step of during numerical control process design stage, based on software integration and machining data integration, a cutting simulation result being fed back to programming stage as a basis for process optimization to achieve closed-loop control during the process design stage, the software integration refers to using CAM software as a platform to achieve effective integration of programming, post-processing and cutting simulation during the numerical control process design stage.

8. The numerical control process design and optimization method based on machining knowledge according to claim 7, wherein in the step of during numerical control process design stage, based on software integration and machining data integration, a cutting simulation result being fed back to programming stage as a basis for process optimization to achieve closed-loop control during the process design stage, the machining data integration comprises process data integration and machining process data integration; wherein, process data integration refers to using an integrated software as a platform and using the machining knowledge data model as a carrier during the numerical control process design stage of the part, to realize transferring of machining requirements of the feature, process steps, machining program, simulation result data across each stage of process design of programming, post-processing, and cutting simulation; and machining process data integration refers to using the machining feature as the carrier to realize transferring of machining program, machining process, each process information of machining step, monitoring and inspection data of machining process, and inspection data of machining result across each stage of an entire machining process, the monitoring and inspection data of machining process being fed back to the process design stage.

9. The numerical control process design and optimization method based on machining knowledge according to claim 8, wherein the programming refers to realizing a new compilation and optimization of the machining program based on machining knowledge and machining process data, comprising process scheme formulation, machining sequence planning, cutting parameter optimization and tool feed strategy decision-making, and the programming implements a standardized programming model, comprising machining program naming, auxiliary geometry creation, part model, blank and fixture structure tree setting, the pre-program generated after programming comprising process information on machining features, operations.

10. The numerical control process design and optimization method based on machining knowledge according to claim 9, wherein the post-processing refers to generating the NC program corresponding to the machining tool based on the pre-program, retaining the process information on machining features and operations in the NC program, and based on the machining requirements of the part, machining process monitoring and inspection triggering instruction is added to the NC program.

11. The numerical control process design and optimization method based on machining knowledge according to claim 10, wherein the cutting simulation refers to simulation verification of a cutting path, further integrating machining experience and knowledge to check the rationality of the usage of cutting tools and sleeves, setting of cutting parameters, and setting of step sequence, and outputting cutting simulation result which is fed back to the programming phase.

12. The numerical control process design and optimization method based on machining knowledge according to claim 11, wherein the machining process monitoring and inspection refers to during the machining process, when the NC program reaches the monitoring and inspection trigger instruction, the machining process monitoring program is activated, the monitoring data of machine tool power and cutting vibration of the machining process is obtained, and the probe program is triggered to realize in-process inspection and ultrasonic thickness measurement at a intermediate stage, and establish an association relationship between the machining process data and the NC program.

13. The numerical control process design and optimization method based on machining knowledge according to claim 12, wherein the machining result inspection refers to measuring final machining dimensions, geometric tolerance, and surface quality of the part based on a measurement program after completion of part machining, and establishing an association relationship between measurement data and machining feature of the part.

* * * * *